April 8, 1930.  S. H. CLAPP  1,753,362
BRAKE MECHANISM
Filed March 20, 1925   2 Sheets-Sheet 1
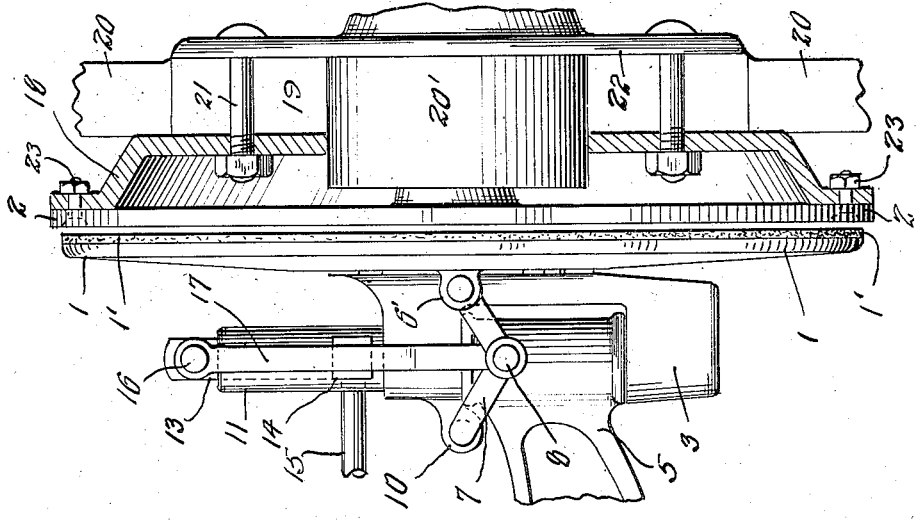
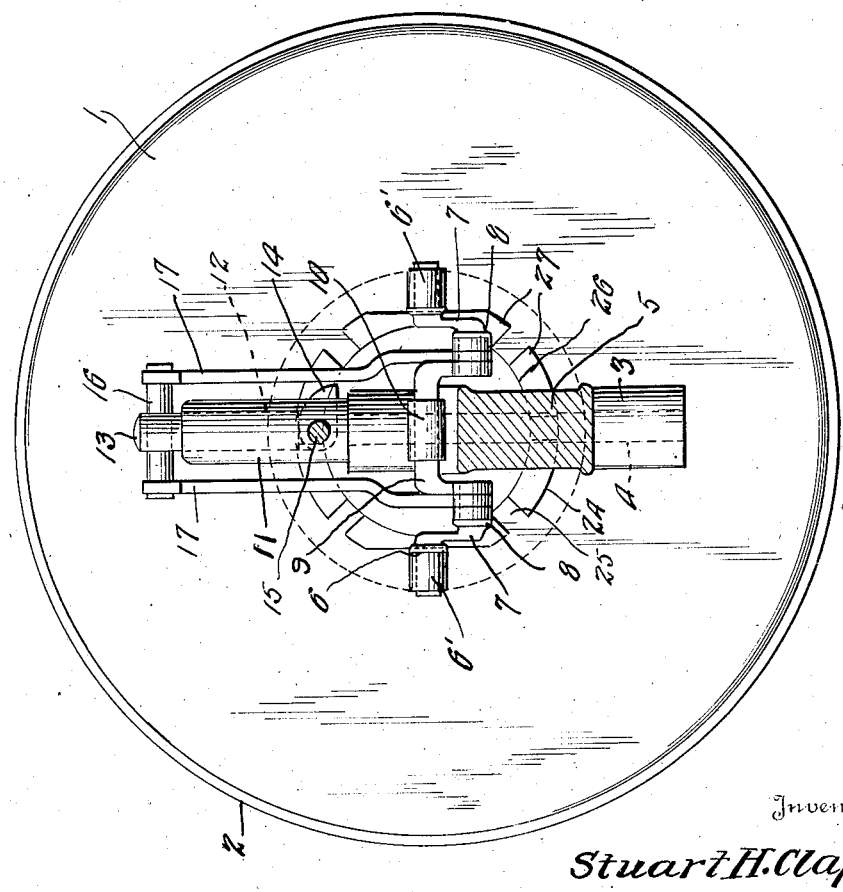
Inventor
Stuart H. Clapp
By Semmes & Semmes
Attorneys April 8, 1930.  S. H. CLAPP  1,753,362
BRAKE MECHANISM
Filed March 20, 1925  2 Sheets-Sheet 2
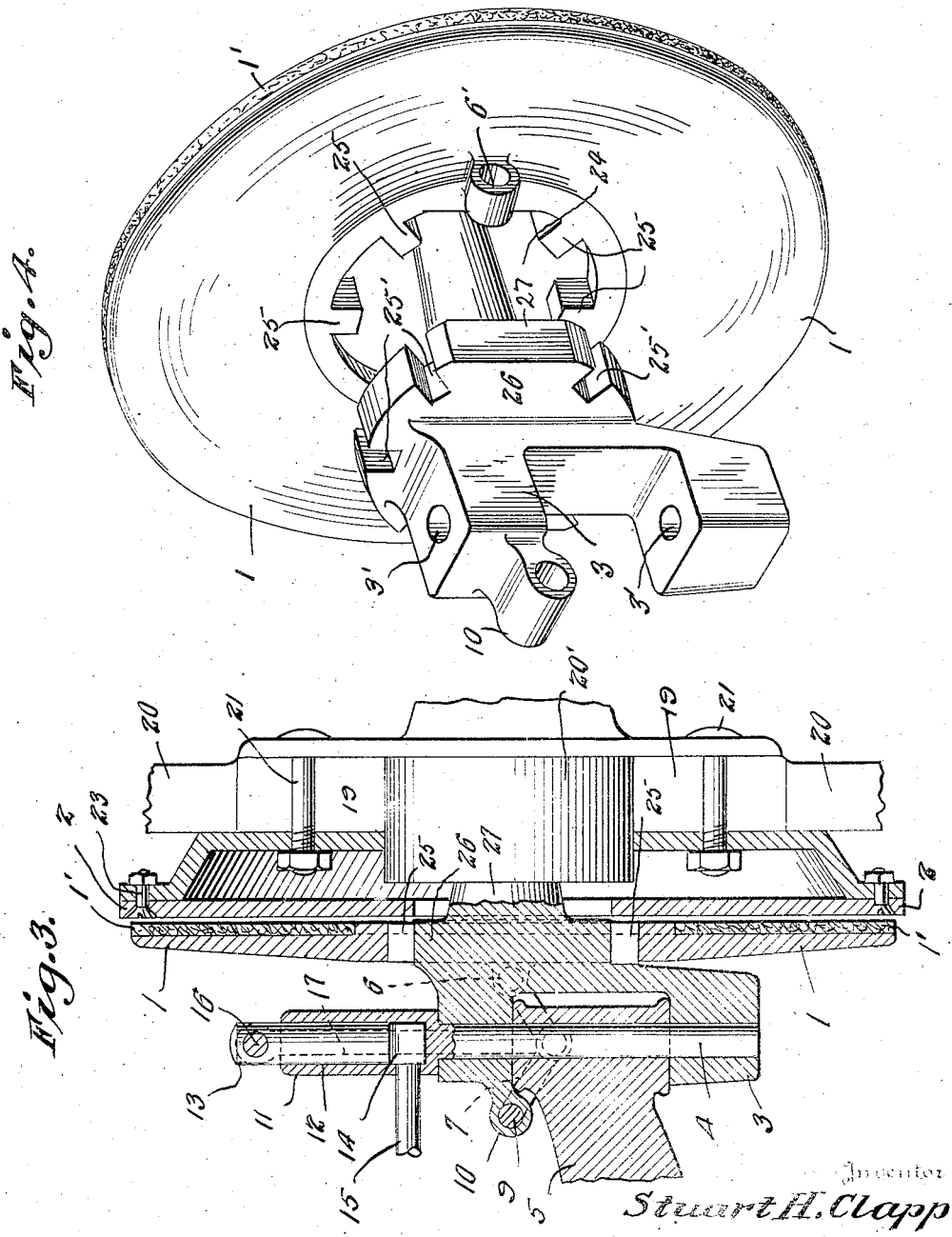

Patented Apr. 8, 1930

1,753,362

UNITED STATES PATENT OFFICE

STUART H. CLAPP, OF WASHINGTON, DISTRICT OF COLUMBIA, ASSIGNOR, BY MESNE ASSIGNMENTS, TO BENDIX BRAKE COMPANY, OF CHICAGO, ILLINOIS, A CORPORATION OF ILLINOIS

BRAKE MECHANISM

Application filed March 20, 1925. Serial No. 17,029.

My invention relates to a brake mechanism, and more particularly to brakes of the type used on steering wheels of automobiles and other vehicles.

The object of my invention is to provide a braking mechanism which will function easily and quickly in whatever position the steering wheel may be in relation to its axle.

Another object of my invention is to provide means with the brake mechanism, whereby a pressure may be exerted upon the friction elements.

A further object of my invention is to provide a mounting for the friction elements of the brake mechanism.

A still further object is to provide a brake mechanism which is strong and sturdy in construction and not liable to get out of order even after long and continuous use.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation have been made the subject of illustration.

In the drawings:

Figure 1 is a side elevation;

Fig. 2 is an end elevation;

Fig. 3 is a vertical sectional view; and

Fig. 4 is an exploded perspective view of the steering knuckle and brake disk.

Referring to the drawings, and more particularly to Figs. 1, 2 and 3, I have shown my brake mechanism comprising a primary disk or plate 1 provided with a suitable friction material 1' on its contact surface, and a secondary disk 2 mounted upon a steering wheel. The disk 1 is mounted upon a steering knuckle 3, and is free to turn with the knuckle about a king pin 4 which passes through suitable openings 3' in the knuckle and similar openings in an axle 5.

Attached to the primary disk at points 6 is a crank shaft 7 having two crank arms 8 and a central portion 9 mounted in a bearing support member 10, which is formed integral with the steering knuckle 3. At the ends of the crank shafts, suitable bearings are provided in the support members 6'. Above the king pin 4 is a housing 11 mounted upon the steering knuckle. This housing is provided with a recess 12 in which is a slidably mounted plunger 13, which is operated by means of a cam 14 fastened to a shaft 15 connected with the service pedal of a vehicle.

Passing through the end of the plunger extending above the housing 11 is a rod 16, having a bearing in the plunger, and connected with the arms 17, forming a yoke member therewith. The arms 17 engage with the crank shaft arms 8, and are bent to conform to the projections of the steering knuckle. When the rod 15 is actuated by suitable connection with the service pedal of the vehicle, the cam 14, which is fastened to the rod, lifts the slidable plunger 13 which is connected through the arms 17 to the crank members 8 of the crank shaft. Since the ends of the crank shaft are connected to the primary disk at 6, and the central portion of the shaft is mounted in the bearing member 10, which is formed with the steering knuckle, a pressure exerted upon the cross rod 16 of the plunger is transmitted through the arms 17 to the crank shaft and causes the primary disk to move axially in the direction of the secondary disk 2.

This secondary disk is mounted upon the steering wheel by any suitable means, and the supporting structure which I use comprises angle members 18 bent with an offset so that the parallel arms are substantially flat at the points of contact with the secondary disk 2 and the base 19 of the spokes 20 in the hub 20' of the wheel structure. Several of such angle members 18 are placed around the wheel and are fastened to the spokes by a bolt and nut means 21 which pass through the plate 22 on the face of the wheel.

The connection between the secondary disk 2 and the angle member 18 is made by a suitable screw-means 23 having the head of its bolt countersunk in the secondary disk so as to prevent any tearing of the friction material 1' when the primary disk 1 is moved into contact with the secondary disk.

By using the bolt and screw means 21 to fasten the secondary disk 2 upon the spokes of the wheel, I am able to employ the same openings for these bolts as are used in the usual wheel construction to connect the face plate 22 upon the spokes. In this construction, the head of the bolts may be countersunk in the plate or they may be rounded off to give the same appearance as the bolts which are usually inserted through the plate and the spokes.

Referring to Fig. 4, I have shown the primary disk removed from its mounting upon the steering knuckle 3. The disk 1 is provided with a circular opening 24 having radial projections or lugs 25 on its circumference, the projections being formed integral with the disk. The steering knuckle 3 has an enlarged shoulder member 26 which is provided with segments 27 formed by means of slots 25', which slots are adapted to receive the corresponding projections 25 when the primary disk is moved into position and mounted upon the steering knuckle. The primary disk when mounted upon the steering knuckle is free to move for a short distance axially in the slots 25' in order to attain a frictional contact with the secondary disk. Any suitable means may be provided for returning disk 1 to its idle position. For example, springs may be tensioned between cross rod 16 and support members 6', or between the ends of crank shaft 7 and the bottom of the steering knuckle 3.

The circular shoulder extension 26 is made of such diameter as to provide a rugged support for the primary disk, and to withstand the torsional strains to which it will be subjected when the primary disk is moved into frictional contact with the secondary disk.

The operation of my device is as follows:
When the cam shaft is rotated by means of the lever attached thereto, the cam rotates with it, bearing against and lifting the plunger located in the axis of the king pin and free to turn with the axis. This plunger being connected at the center of the toggle action of the yoke, increases the angle formed from the fixed point on the steering knuckle and the point to which it is pinned to the friction disk to slide on its splines in the direction of the wheel bearing the secondary disk. As pressure is exerted on this toggle action through the plunger and the rotation of the cam and the cam shaft, the secondary friction disk, which is held from rotating by the splines cut in it and in the steering knuckle, is pressed against the rotating disk on the wheel, setting up a frictional stress which tends to bring the secondary disk and wheel to a state of rest. As the king pin is fastened in the axle, and as the turning knuckle turns about this king pin, the cam shaft retains its relative position to the axle, but the plunger and other component parts of the device are free to rotate in or about the axis of the king pin. Therefore, pressure applied to a lever connected at the cam shaft exerts a pressure against the wheel in whatever position the wheel may be in relation to the axle.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a brake mechanism, including an axle, a wheel, a primary disk, means for mounting the primary disk for axial but nonrotatable movement, a secondary disk rotating with the wheel, and a series of toggles to move the primary disk into frictional contact with said secondary disk.

2. In a brake mechanism, including an axle, a steering wheel, and a steering knuckle, a primary friction plate carried by the knuckle, means for mounting the primary disk upon the steering knuckle, a secondary disk, and means to move the primary disk into frictional contact with said secondary disk, including an operating member movable along the steering axis of the wheel.

3. In a brake mechanism, including an axle, a steering wheel, and a steering knuckle, a primary friction plate, means for mounting the primary disk upon the steering knuckle, a secondary disk, and means to move the primary disk into frictional contact with said secondary disk including a plunger in the steering axis of the wheel.

4. In a brake mechanism, including an axle, a steering wheel, and a steering knuckle, a primary friction plate, means for mounting the primary disk upon the steering knuckle, a secondary disk, and means to move the primary disk into frictional contact with said secondary disk including a cam-operated plunger.

5. In a brake mechanism, including an axle, a steering wheel, and a steering knuckle, a circular primary friction plate provided with a circular opening concentric with the axle, said opening having a plurality of radial projections on its circumference, means for mounting the primary disk upon the steering knuckle against rotation but for axial movement thereover, a secondary disk, and a series of toggles connected at one end to the primary disk and at the opposite end to the knuckle, said toggles being operable to move the primary disk into frictional contact with said secondary disk.

6. In a brake mechanism, including an axle, a steering wheel, and a steering knuckle, a circular primary friction plate provided with a circular opening concentric with the axle, said opening having a series of inwardly projecting radial lugs, means rigid with the knuckle for mounting the primary disk upon the steering knuckle, said means including parts engaged with the radial lugs of the plate, a secondary disk, and a series of means to move the primary disk into frictional contact with said secondary disk.

7. In a brake mechanism, including an axle, a steering wheel, and a steering knuckle, a circular primary friction plate provided with a circular opening concentric with the axle, said opening having a series of inwardly projecting radial lugs formed integral with the friction plate, means for mounting the primary disk upon the steering knuckle, a secondary disk, and a series of means to move the primary disk into frictional contact with said secondary disk.

8. In a brake mechanism, including an axle, a steering wheel, and a steering knuckle, a primary disk, a mounting for said primary disk comprising a shoulder extension formed integral with the steering knuckle and over which the primary disk is axially nonrotatably slidable, a secondary disk, and a series of means to move the primary disk in frictional contact with said secondary disk.

9. In a brake mechanism, including an axle, a steering wheel, and a steering knuckle, a primary disk, a mounting for said primary disk, comprising a circular shoulder extension formed integral with the steering knuckle, a secondary disk, and a series of means to move the primary disk in frictional contact with said secondary disk.

10. In a brake mechanism, including an axle, a steering wheel, and a steering knuckle, a primary disk, a mounting for said primary disk comprising a circular shoulder extension formed integral with the steering knuckle and having slots cut in its periphery and upon which the primary disk is axially slidably supported, a secondary disk, and a series of means to move the primary disk in frictional contact with said secondary disk.

11. In a brake mechanism, including an axle, a steering wheel and a steering knuckle, a primary disk, a mounting for said primary disk comprising a circular shoulder extension having a plurality of segments on its periphery formed integral with the steering knuckle, said primary disk being axially slidably supported upon said shoulder and interengaged therewith against rotation thereover, a secondary disk, and a series of means to move the primary disk in frictional contact with said secondary disk.

12. In a brake mechanism, including an axle, a steering wheel and a steering knuckle, a primary disk, a mounting for said primary disk comprising a circular plate extension formed integral with the steering knuckle and having a plurality of radial slots cut in its periphery, a secondary disk, and a series of means to move the primary disk in frictional contact with said secondary disk.

13. In a brake mechanism including an axle, a steering wheel and a steering knuckle, a primary disk, a secondary disk, and a series of means adapted to move the primary disk into frictional contact with the secondary disk, comprising a toggle connection, a yoke and a cam operated plunger.

14. In a brake mechanism including an axle, a steering wheel and a steering knuckle, a primary disk, a secondary disk, and a series of coacting means adapted to move the primary disk axially into frictional contact with the secondary disk, comprising a toggle connection, a yoke and a cam operated plunger.

15. In a brake mechanism including an axle, a steering wheel, and a steering knuckle, a primary disk, a secondary disk, and a series of means adapted to move the primary disk into frictional contact with the secondary disk, comprising a crankshaft having two crank arms, the ends of the crankshaft being attached to the primary disk, said shaft having its central portion between the crank arms attached to the steering knuckle, a yoke and a cam operated plunger.

16. In a brake mechanism including an axle, a steering wheel and a steering knuckle, a primary disk, a secondary disk, and a series of means adapted to move the primary disk into frictional contact with the secondary disk, comprising a recessed housing mounted upon the steering knuckle, a cam operated plunger slidably mounted in the housing, and a yoke pivoted on the plunger and engaging the crank arms of the crankshaft.

17. In a brake mechanism including an axle, a steering wheel, a steering knuckle, a primary friction plate provided with a circular opening concentric with the axle, said opening having a plurality of radial projections on its circumference, a circular shoulder extension formed integral with the steering knuckle and having slots cut in its periphery, a secondary disk, and a series of means to move the primary disk into frictional contact with said secondary disk.

18. In a brake mechanism including an axle, a steering wheel and a steering knuckle, a primary friction plate provided with a circular opening concentric with the axle, said opening having a plurality of radial projections on its circumference, a circular shoulder extension formed integral with the steering knuckle and having slots cut in its periphery, a secondary disk, and a series of means adapted to move the primary disk into frictional contact with the secondary disk, comprising a crankshaft having two crank arms, the ends of the crankshaft being attached to the primary disk, said shaft having its central portion between the crank arms attached to the steering knuckle, a yoke, and a cam operated plunger.

19. In a brake mechanism including an axle, a steering wheel and a steering knuckle, a primary friction plate provided with a circular opening concentric with the axle, said opening having a plurality of radial projections on its circumference, a circular shoulder extension formed integral with the steering knuckle and having slots cut in its periphery, a secondary disk, and a series of means adapted to move the primary disk into frictional contact with the secondary disk comprising a recessed housing mounted upon the steering knuckle, a cam operated plunger slidably mounted in the housing, and a yoke pivoted on the plunger and engaging the crank arms of the crankshaft.

20. A toggle-operated axially-movable brake friction member for a vehicle wheel.

21. In combination with an axially-movable brake friction member for a pivoted wheel, applying means therefor comprising a toggle with its knuckle operating in the plane of the wheel pivot to increase the effective length of the toggle perpendicularly with respect to the plane of the wheel.

22. A wheel movable about two axes, in combination with a disk brake for said wheel and operating means for the brake including a part movable along each one of said axes.

23. A pivoted wheel, in combination with a disk brake for said wheel and operating means for the brake including a part movable along the axis of the wheel pivot.

24. Brake mechanism for a swiveled wheel comprising, in combination, a friction element carried by the wheel, a retarding element movable into engagement with the friction element, and means operable to move said retarding element into engagement with the friction element including a plunger located in the swiveling axis of the wheel, a part engaging said plunger to actuate the same, and a toggle connection between said plunger and retarding element.

25. Brake mechanism for a swiveled wheel comprising, in combination, a friction element carried by the wheel, a retarding element movable into engagement with the friction element, and means operable to move said retarding element into engagement with the friction element including a plunger movable in the swiveling axis, a part pivotally supported in said swiveling axis engaging the plunger to actuate the plunger, and pivotally supported mechanism coupled with the plunger to be actuated thereby.

26. Brake mechanism for a swiveled wheel comprising, in combination, a friction element carried by the wheel, a retarding element movable into engagement with the friction element, and means operable to move said retarding element into engagement with the friction element including a plunger located in the swiveling axis of the wheel and offset inwardly from the plane of the retarding element, means engaging said plunger at one end of the swiveled support of the wheel and between said support and the end of the plunger.

27. Brake mechanism for a swiveled wheel comprising, in combination, a friction element carried by the wheel, a retarding element movable into engagement with the friction element, and means operable to move said retarding element into engagement with the friction element including a plunger located in the swiveling axis of the wheel, and parts connected therewith and arranged on opposite sides thereof in the plane of the swiveling axis.

In testimony whereof I affix my signature.

STUART H. CLAPP.